June 22, 1943.  H. O. WILLIAMS  2,322,492
AUTOMATIC BRAKE ADJUSTING MEANS
Filed Jan. 9, 1941
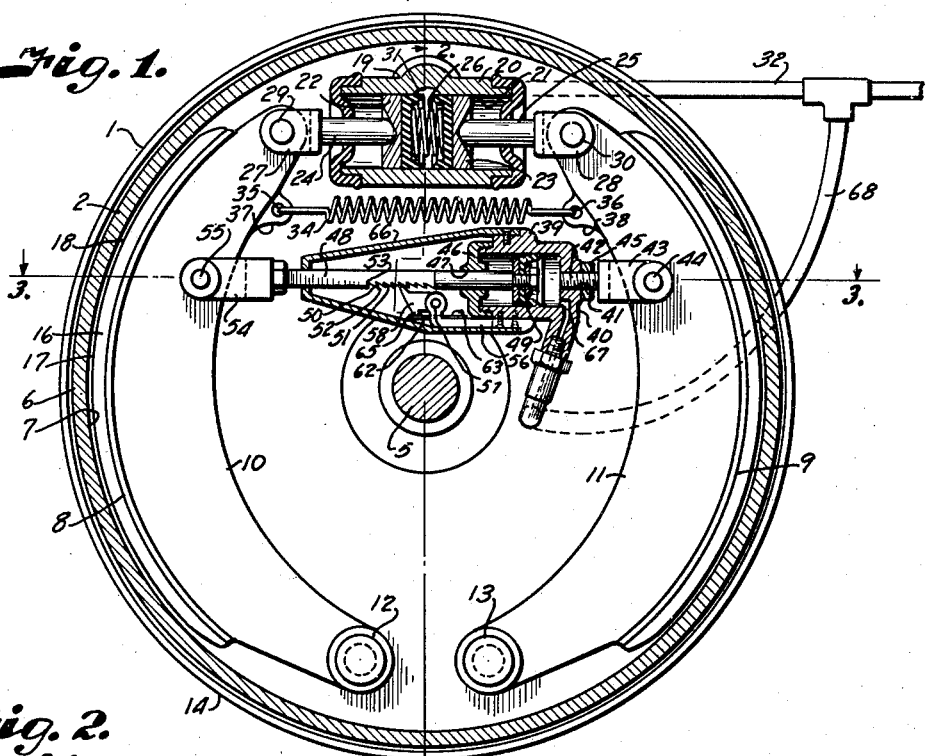
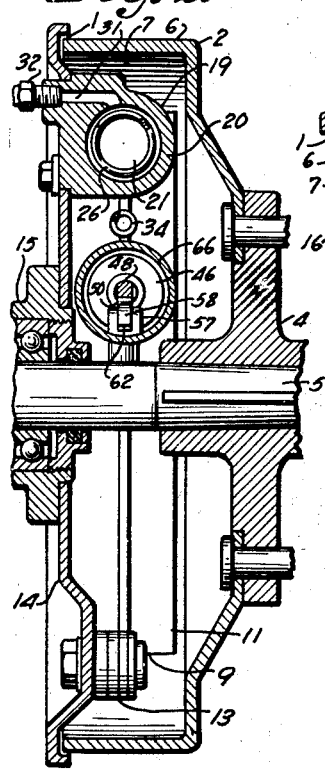
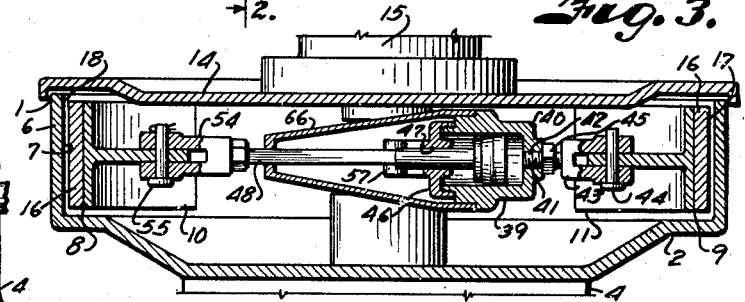
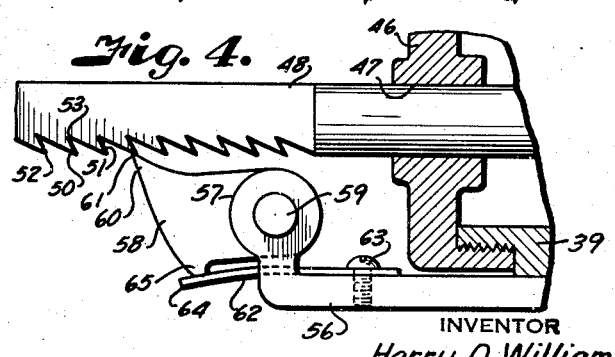
INVENTOR
Harry O. Williams
BY
Arthur E. Brown
ATTORNEY Patented June 22, 1943

2,322,492

UNITED STATES PATENT OFFICE 2,322,492

AUTOMATIC BRAKE ADJUSTING MEANS

Harry O. Williams, Kansas City, Mo.

Application January 9, 1941, Serial No. 373,759

6 Claims. (Cl. 188—79.5)

This invention relates to brakes, particularly those operated by pressure fluids, and has for its principal object to provide a brake of this character with mechanism responsive to the pressure fluid for automatically maintaining a constant predetermined working clearance of the braking elements with respect to the rotary members which they retard.

Other objects of the invention are to provide a simple adjusting mechanism that is readily adapted to existing type brakes; to provide an adjusting mechanism that acts equally on each of the braking elements for simultaneously adjusting the shoes and maintaining them in centered position with respect to the brake drum engaged thereby; and to provide a positively actuated mechanism that is not affected by "chattering" when the brake shoes have become roughened, or by accumulation of grit between the brake-band and drum.

In accomplishing these and other objects of the invention, as hereinafter pointed out, I have provided improved details of structure, the preferred form of which is illustrated in the accompanying drawing, wherein:

Fig. 1 is a section through a pressure fluid actuated brake equipped with an adjusting mechanism embodying the features of the present invention.

Fig. 2 is a cross-section through the brake on the line 2—2 of Fig. 1.

Fig. 3 is a transverse section on the line 3—3 of Fig. 1.

Fig. 4 is an enlarged detail view of the tooth and pawl connection between the spacing members of the adjusting mechanism.

Referring more in detail to the drawing:

1 designates a brake mechanism including a rotary member such as a brake drum 2 attached to a member to be rotated, such as a wheel of a motor vehicle indicated by the hub 4, the wheel being mounted upon an axle 5 as in conventional practice.

The drum 2 includes an annular flange 6 having a braking surface 7 on the inner side thereof adapted to be engaged by braking elements 8 and 9, the braking elements illustrated being in the form of arcuate shoes 10 and 11, pivoted at one of their ends as at 12 and 13 to a stationary plate 14 closing the inner face of the drum, the plate 14 being fixed to the axle housing 15.

The shoes 10 and 11 carry brake linings 16 having braking surfaces 17 normally retained in predetermined spaced relation with respect to the braking surface 7 of the drum, as indicated at 18, when the shoes are in disengaged position, Fig. 1. The shoes 10 and 11 are moved on their pivotal connections 12 and 13 to effect engagement of the braking surfaces thereof with the braking surface of the drum by means of a pressure actuated mechanism 19.

The pressure actuated mechanism includes a cylinder 20 having fixed support on the plate 14 and is provided with a piston chamber 21, located intermediate the ends of the shoes opposite the pivotal connections. Slidable in the chamber 21 are pistons 22 and 23 normally retained in seated engagement with rods 24 and 25 by a spring 26 inserted therebetween. The rods 24 and 25 have clevis-shaped ends 27 and 28 pivotally connected with the adjacent ends of the shoes as indicated at 29 and 30.

Pressure fluid is admitted to the cylinder chamber at point between the pistons through a port 31 which is connected by a duct 32 with a master cylinder (not shown), as in conventional automotive practice, so that when the master cylinder is actuated to apply pressure on the fluid, the fluid spreads the piston to move the shoes into braking contact with the drum. Upon release of pressure in the master cylinder, the shoes are returned to normal position by a contraction spring 34 having hooked ends 35 and 36 engaged in the apertures of ears 37 and 38 projecting inwardly from the shoes at a point adjacent the pressure fluid actuated means.

Brakes of this character are normally equipped with manually adjustable means for retaining the braking surfaces of the shoes in spaced relation with the braking surface of the drum to provide a working clearance therebetween and prevent dragging of the shoes on the drum when the brake is in released condition. As the braking surfaces of the shoes wear away this clearance increases to an excessive amount, and it is necessary to readjust the shoes to restore the proper working clearance, but, due to the fact that this adjustment must be made by an automotive mechanic, it is often delayed until the brakes are completely ineffective. In order to overcome this difficulty, I have provided an automatically operable means for maintaining the braking shoes in position to provide the desired working clearance with the adjusting means operable responsive to the pressure fluid used in actuating the brake, as now to be described.

This mechanism includes a cylinder 39 having a closed end 40 provided with a threaded opening 41 in which is adjustably threaded a shank 42 of a clevis 43, the clevis 43 being connected with one of the shoes by a pin 44. The cylinder is retained in adjusted relation with the threaded shank 42 by a lock nut 45 threaded on the shank for engaging the closed end of the cylinder, as clearly shown in Figs. 1 and 3. The opposite end of the cylinder is provided with a removable cap 46 having a central bearing opening 47 in which is slidably mounted a rod 48, the rod 48 carrying a piston 49 that is slidable in the cylinder. The opposite end of the rod 48 is flattened and provided with a series of teeth 50 having pawl engaging faces 51 arranged at an acute angle relatively to the axis of the rod whereby the tips 52 are offset toward the piston end of the rod relatively to the base portions 53 of the teeth for a purpose later described. The outer end of the rod 48 carries a clevis 54 having pivotal connection with the brake shoe 10 by a pin 55.

Fixed to the cylinder 39, on the side thereof adjacent the teeth on the rod, is an arm 56 projecting beyond the rod 48 and having a head 57 pivotally supporting a pawl 58, the pawl 58 being pivotally mounted on a pin 59, Fig. 4. The pawl 58 includes a toe 60 having a shape substantially conforming to the angle between the teeth so that the tip 61 thereof is adapted for close engagement in the angle between the base of the face 51 of one tooth and the back face of an adjacent tooth. The pawl 58 is retained in engagement with the teeth by a leaf spring 62 fixed to the arm 56 by a fastening device 63 and having an end 64 projecting under the heel 65 of the pawl. The tooth portion of the rod, including the pawl just described, are enclosed within a housing 66 fixed to the pressure cylinder as shown in Figs. 1 and 3.

The closed end of the cylinder 41 is provided with a port 67 through which pressure fluid is admitted to the cylinder for acting on the piston 49, the port being connected by a duct 68 with the duct 32 supplying the brake cylinder.

The brake mechanism constructed and assembled as described, operates as follows:

The adjusting nut 45 is loosened and the threaded shank 42 of the clevis 43 is adjusted relatively to the cylinder 41 so that when the brake shoes are in disengaged position the toe of the pawl is squarely engaging the face 51 of one of the teeth to maintain a predetermined normal working clearance between the braking surfaces of the shoes and the braking surface of the drum, leaving the piston 49 in sufficiently spaced relation with the closed end of the cylinder to provide a pressure chamber therebetween. Upon admission of the pressure fluid to the brake actuating cylinder, the shoes will be moved apart so that the braking surfaces thereof are brought into braking contact with the rotary member to effect retardation thereof. During this movement of the shoes, the cylinder 41 and the toothed rod 48 will move relatively to each other, with the toe 60 of the pawl 58 riding on the back face of the adjacent tooth. When the pressure fluid is admitted to the braking cylinder, pressure is also applied between the piston 49 and the closed head of the cylinder to effect positive movement of the toothed rod relatively to the cylinder so that the toe of the pawl is positively moved toward the tip of a tooth. Upon release of the pressure fluid in the braking cylinder, the spring 34 returns the shoes to normal position with the toe of the pawl again engaging the face 51 of the tooth. This movement will be effected upon each application of the brake, and, as long as the clearance is such that the braking surfaces of the shoes engage the braking surfaces of the drum before the toe of the pawl rides off the tip of the adjacent tooth, the pawl retains its same relative relation with its tooth on the rod, but if wear occurs between the braking surfaces, then the tip of the pawl will ride off the tip of the engaged tooth when pressure is admitted between the pistons 49 and the closed end of the cylinder, whereupon the face of the next adjacent tooth is engaged by the pawl. Therefore when the shoes are returned to released position by the spring 34, the pawl will engage said next adjacent tooth and approximately restore the original working clearance between the braking surfaces.

Attention is particularly directed to the angular relation of the pawl engaging faces of the teeth. If these faces were arranged at right angles to the axis of the rod, the pawl, when passing over the tip of a tooth, would not allow the brakes to return sufficiently so as to provide clearance between the braking surfaces, however, with the angular faces or undercut teeth, the pawl, after dropping over the top of a tooth, will have sufficient clearance with respect to the base portion of the tooth to provide clearance between the working surfaces and prevent dragging of the brakes immediately after an automatic adjustment has been effected.

From the foregoing it is obvious that I have provided an automatic brake adjusting means that is positively actuated responsive to movement of the braking elements by the pressure fluid whenever the braking elements have worn to a point where an adjustment is necessary in maintaining a predetermined working clearance.

What I claim and desire to secure by Letters Patent is:

1. A pressure fluid actuated brake including, a rotary member, braking elements supported in braking relation with the rotary member and having a predetermined normal working clearance therewith, pressure fluid actuated means for moving the braking elements into contact with the rotary member, means for supplying pressure fluid to the pressure fluid actuated means, means for automatically maintaining said working clearance including a pair of members movable relatively to each other when the brake clearance is normal, means connecting the members of said pair with the respective braking elements, clutch means connecting the pair of members whereby the position of said braking elements is changed relatively to the rotary member when the working clearance exceeds said normal clearance, pressure fluid actuated means for rendering said clutch means effective, and a constantly open fluid conducting connection between said pressure fluid actuated means.

2. A pressure fluid actuated brake including, a rotary member, braking elements supported in braking relation with the rotary member and having a predetermined normal working clearance therewith, pressure fluid actuated means for moving the braking elements into contact with the rotary member, means for supplying a pressure fluid to the pressure fluid actuated means, a cylinder member connected with one of the braking elements, a toothed rod connected with the other braking element, a piston on the toothed rod and operable in said cylinder member, means carried by the cylinder for engaging the teeth of said rod, and constantly open means connecting the pressure fluid supply for said pressure fluid actuated means with said cylinder to effect positive movement of the toothed rod and cylinder member upon actuation of the braking elements by said pressure fluid actuated means.

3. A pressure fluid actuated brake including, a rotary member, braking elements supported in braking relation with the rotary member and having a predetermined normal working clearance therewith, pressure fluid actuated means for moving the braking elements into contact with the rotary member, means for supplying a pressure fluid to the pressure fluid actuated means, a cylinder member connected with one of the braking elements, a toothed rod connected with the other braking element, a piston on the toothed rod and operable in said cylinder, means carried by the cylinder for engaging the teeth of said rod, constantly open means connecting the pressure fluid supply for said pressure fluid actuated means with said cylinder to effect relative movement of the toothed rod and cylinder member upon actuation of the braking elements by said pressure fluid actuated means, and means connecting the braking elements for normally retaining one of said teeth in contact with the tooth engaging means.

4. In a brake, a rotary member, braking elements supported in braking relation with the rotary member and having a predetermined normal working clearance therewith, means for moving the braking elements into contact with the rotary member, a cylinder member connected with one member of the braking elements, a toothed rod connected with the other braking element, a piston on the toothed rod and operable in said cylinder, a freely yieldable pawl carried by the cylinder for engaging the teeth of said rod, and means supplying said cylinder member with a pressure fluid to effect relative movement of the toothed rod and cylinder member.

5. In a pressure fluid actuated brake, a rotary member, a braking element supported in braking relation with the rotary member and having a predetermined normal working clearance therewith, pressure fluid actuated means for moving the braking element into braking contact with the rotary member, yielding means for retracting the brake element, means for supplying pressure fluid to the pressure fluid actuated means for effecting actuation thereof, means for automatically maintaining said working clearance including a toothed member, a piston connected with the toothed member, a cylinder for the piston, a pawl mounted on the cylinder and engageable with the teeth of said toothed member to limit retractive movement of the piston and maintain said normal working clearance, and constantly open fluid conducting means connecting said pressure fluid supply with the cylinder to effect relative movement of said piston and cylinder and between the teeth and said pawl simultaneously with movement of the braking element by said pressure fluid actuated means to further limit said retractive movement of the braking element when wear tends to increase said normal clearance.

6. In a pressure fluid actuated brake, a rotary member, braking elements supported in braking relation with the rotary member and having a predetermined normal working clearance therewith, pressure fluid actuated means for moving the braking elements into braking contact with the rotary member, yielding means interconnecting the braking elements to effect retraction thereof, means for supplying pressure fluid to the pressure fluid actuated means for effecting actuation thereof, means for automatically maintaining said working clearance including a pair of members movable relative to each other, one member of the pair being connected with one braking element and the other member of the pair being connected with the other braking element to move from each other when the pressure fluid actuated means moves the braking elements into braking contact with the rotary member, means interconnecting said pair of members for limiting retractive movement of said pair of members to maintain said normal working clearance, and constantly open fluid conducting means connected with said pressure fluid supply to effect movement of said pair of members apart with movement of the braking elements by said pressure fluid actuated means to further limit said retractive movement of the braking elements and maintain said normal clearance under wear of said braking elements.

HARRY O. WILLIAMS.